United States Patent Office 3,297,071
Patented Jan. 10, 1967

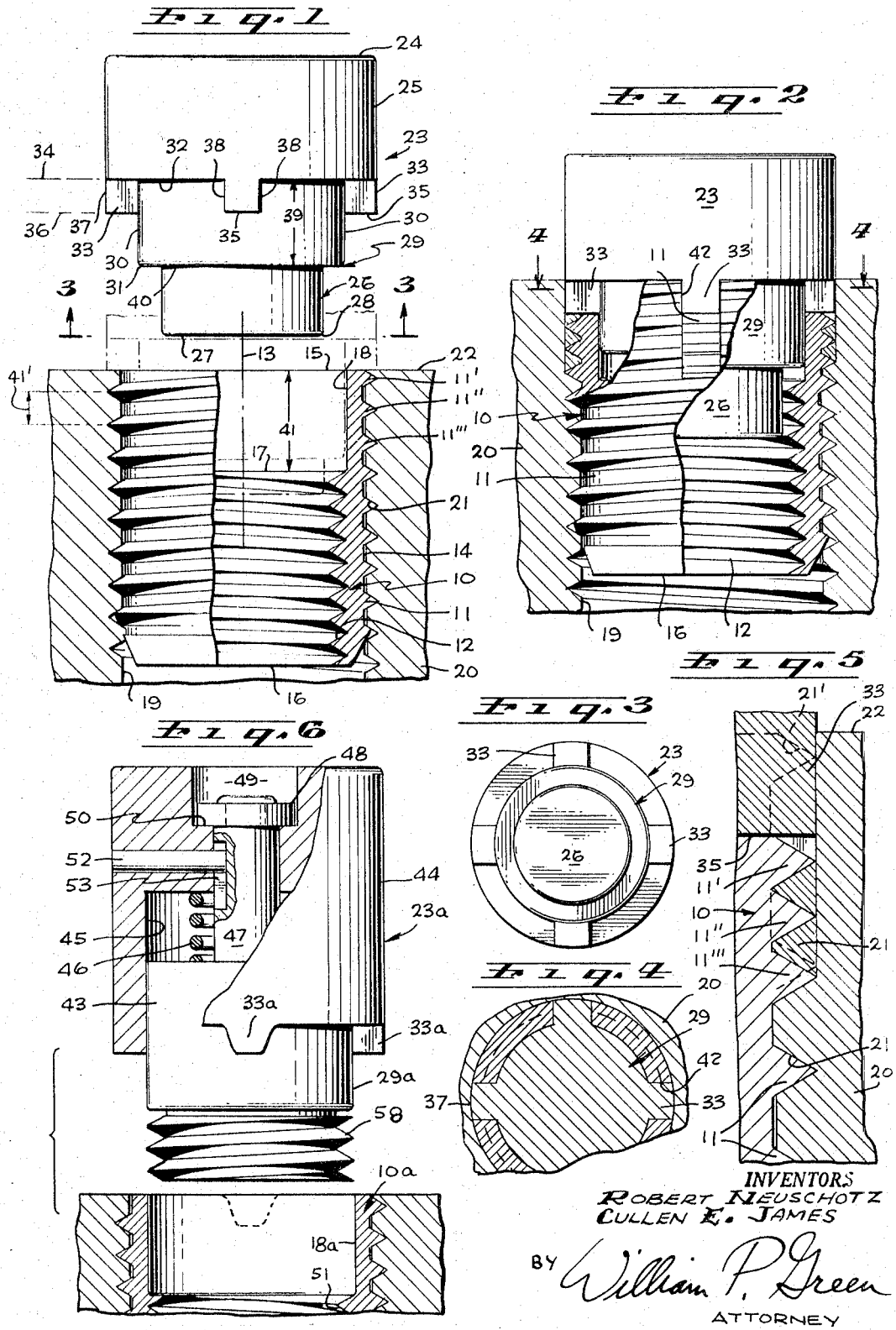

3,297,071
LOCKING OF THREADED PARTS AGAINST REMOVAL
Robert Neuschotz, Beverly Hills, and Cullen E. James, Southgate, Calif., assignors to Newton Insert Co., Los Angeles, Calif., a corporation of California
Filed Oct. 8, 1964, Ser. No. 405,647
11 Claims. (Cl. 151—22)

This invention relates to the installation of threaded elements, such as threaded inserts, within carrier parts, in a manner locking the elements against unscrewing rotation from the carrier part.

There have in the past been devised numerous different types of locking inserts and other threaded elements constructed to be locked against unwanted removal from a part within which the element is mounted. However, each of these prior locking elements with which we are familiar has required the provision on the element, at the time of manufacture, of some special locking structure, adapted to interfit in locking relation with a part into which the element is screwed. In some instances, for example, the external thread of the element has been given a serrated configuration, or an unthreaded portion of the outer surface of the element has been serrated, so that it may be driven into an effective locking engagement with the carrier part. In other inserts, keys or other separate locking elements have been employed, being adapted for movement to locking positions after the insert has reached a fully installed position in the carrier.

A major object of the present invention is to provide an improved process and apparatus for locking an insert or other threaded element in a carrier part, in a manner enabling use of a threaded element which is structurally simpler and more easily manufactured than are prior similar devices. As will appear, while the present invention is applicable, if desired, to the installation of inserts having serrations and other specially formed locking shapes, an important advantage of the invention resides in the fact that it also permits the attainment of an effective locking action without any such special shaping of the threaded element. It is possible, utilizing the principles of the invention, to provide a lock in which the locking structure consists of an initially completely conventional external thread on the insert or other threaded element, with this thread being deformable by a locking tool upon installation of the element, in a manner forming an interfitting lock against unscrewing rotation when the tool is actuated.

During the locking operation, an installing tool strikes an end surface of the insert or other threaded element at a localized area, to deform a portion of a predetermined turn or turns of the external thread axially relative to a circularly offset second portion of the same turn. Preferably, this deforming action is attained by providing on the locking tool one or more projections which engage only certain portions of the end surface of the threaded element, and act to recess those portions axially inwardly relative to other undeformed circularly offset or intermediate areas. At each of the deformed locations, a turn or turns of the external thread are, by the striking action, offset axially relative to circularly adjacent portions of the same turns, so that they in effect form discontinuities in the thread blocking unscrewing rotation of the element. When the element being installed is a tubular insert, having both internal and external threads, the insert is desirably supported internally, against radially inward collapse during and as a result of the exertion of the axial driving or deforming forces thereagainst. For this purpose, the insert may contain an inner counterbore, desirably cylindrical in configuration, with that counterbore being engaged and supported by an external surface on the driving tool during the driving action.

The above and other features and objects of the invention will be better understood from the following detailed description of the typical embodiments illustrated in the accompanying drawing, in which:

FIG. 1 is a view showing an insert adapted to be installed in accordance with the invention, and showing also a tool for locking the insert against unscrewing rotation after installation;

FIG. 2 shows the insert and tool of FIG. 1 after the insert has been locked into place;

FIG. 3 is a reduced dimension view taken on line 3—3 of FIG. 1;

FIG. 4 is a reduced cross section taken on line 4—4 of FIG. 2;

FIG. 5 is a somewhat diagrammatic greatly enlarged fragmentary axial section through one of the deformed locking areas of FIG. 2; and FIG. 6 is a view similar to FIG. 1, but showing a variational type of tool for installing the insert.

In FIG. 1, the threaded element to be installed is illustrated as an essentially tubular insert 10 having external threads 11 and internal threads 12 both centered about a common axis 13 of the device. The external threads may have an axially extending cylindrical modified minor diameter surface 14 between successive turns of the external threads. The upper or axially outer end of the insert is defined by an annular surface 15 which may extend directly transversely of axis 13. External threads 11 continue along substantially the entire axial length of insert 10, while internal threads 12 preferably continue only from the axially inner end 16 of the insert to a location 17 spaced inwardly from outer surface 15. Between point 17 and surface 15, the insert contains a counterbore 18, desirably of straight cylindrical configuration centered about axis 13, and typically of a diameter corresponding to (or slightly larger than) the major diameter of internal threads 12.

Insert 10 is illustrated in FIG. 1 as being screwed into a passage 19 formed in a carrier part 20. This passage 19 has internal threads 21 which are shaped in correspondence with, and are threadedly engageable with, external threads 11 of the insert. The carrier part 20 may have an outer surface 22, which is typically planar, and with which outer end surface 15 of the insert is approximately flush in the final installed position of the insert.

For converting the insert 10 to a locked condition within the carrier part, we may utilize a tool of the type illustrated at 23 in FIG. 1. This tool may be formed of a rigid strong metal adapted to be driven against the end surface 15 of the insert by means of a hammer, press, or other force applying unit or tool engageable against a transverse end surface 24 of tool 23. The body of the tool may have external clylindrical surface 25, centered about axis 13, and may rigidly carry at its axially inner end a reduced diameter externally cylindrical pilot portion 26. The outer surface 27 of portion 26 may be centered about axis 13, and be of a diameter corresponding approximately to the minor diameter of internal threads 12 of the insert, to fit closely therein. Also, the inner end of pilot 26 may be annularly rounded as indicated at 28, to properly enter and be centered in the insert. Axially outwardly of its pilot portion 26, the tool 23 has a portion 29 having an outer cylindrical surface 30 of a diameter intermediate that of surfaces 25 and 27. More specifically, the diameter of surface 30 corresponds to (or may be slightly greater than) that of internal counterbore surface 18 of the insert, to fit closely therein (or to slightly expand surface 30 and thereby take up any clearance between threads 11 and 21). As in the case of pilot portion 26 of the tool, the portion 29 may be annularly rounded at its axially inner end, as indicated at 31, to easily enter and be centered within surface 18. It is also contemplated that surface 30 may taper or reduce slightly and progressively in diameter as it advances downwardly, from surface 32 to the lower end of portion 29, to slightly expand the upper portion of the insert to a correspondingly tapered condition, and thereby facilitate removal of the tool after an installing operation.

At the axially outer end of surface 30, tool 23 has a transverse surface 32, which may extend directly transversely of axis 13, and may be annular except insofar as that surface is interrupted by provision of a number of circularly spaced projections 33 on the tool. These projections extend axially inwardly (downward in FIG. 1) beyond the plane 34 of shoulder 32, to present inner surfaces 35 lying in a second transverse plane 36 disposed parallel to plane 34 and perpendicular to axis 13. Each of the projections has an outer slightly curved partial cylindrical surface 37 forming a continuation of outer surface 25 of the tool, and has two spaced typically parallel planar opposite side surfaces 38, extending axially between and perpendicular to the two planes 34 and 36. As will be apparent from FIG. 1, surfaces 32, 38 and 35 extend radially from the diameter of surface 30 to the diameter of surface 25. Each projection 33 may be integrally connected to surface 30, to project outwardly therefrom.

The axial dimension 39 from plane 34 of the surface 32 to the inner extremity 40 of portion 29 of the tool corresponds approximately to, or is slightly less than, the axial dimension 41 of the insert from its outer surface 15 to the location 17. The axial thickness of projections 33 is substantially less than dimension 39 or dimension 41, and preferably is equal to between about one-half and one and one-half times the axial lead or pitch distance 41' between the centers of two successive turns of the external threads 11 (desirably being approximately equal to said pitch distance).

In performing an insert installing operation in accordance with the process of the present invention, and utilizing the tool of FIG. 1, the first step is to screw insert 10 into carrier part 20 to the position illustrated in FIG. 1. After the insert has reached this position, tool 23 is inserted axially into the outer end of the insert, to the broken line position of FIG. 1, in which end surfaces 35 of projections 33 engage against the axially outer end surface 15 of the insert. In this condition, surface 30 of portion 29 of the tool engages counterbore 18 of the insert, and pilot portion 26 of the tool projects axially inwardly into a centered relation within internal threads 12. With the tool in the broken line position of FIG. 1, an operator exerts axially inward (downward) force against upper or outer transverse surface 24 of tool 23, to drive the tool downwardly to the position of FIG. 2. As the tool thus moves downwardly, projections 33 exert localized force against surface 15 of the insert, at only certain circularly spaced locations, and not at the intermediate points between the projections, to cut into the material of the insert as illustrated in FIG. 2. More specifically, each of the projections 33 forms a localized notch or recess 42 in the end of the insert, and in the material of carrier part 20, with this recess being of a shape corresponding approximately to the shape of the projection. In forming this notch, the projection drives downwardly the portions of the insert side wall and carrier part which are directly beneath the projection. Thus, the short segments of the external threads 11 which are carried by each such downwardly displaced portion of the side wall of the insert are shifted downwardly relative to the portions of the same turns of the threads which are circularly between projections 33 and not distorted thereby. This action forms locking discontinuities or distortions in the upper end turn of external thread 11 and preferably in all of the turns down to a location opposite the lower end 17 of counterbore 18.

FIG. 5 represents at 11' a portion of the end turn of thread 11, which portion may be considered as initially having been received within a mating thread recess 21' formed between successive turns of the internal thread 21 of the carrier part. The downward driving action of one of the projections 33 of the setting tool has displaced thread segment 11' downwardly from the recess 21' to the full line position of segment 11' in FIG. 5. A segment 11" of the next lower turn of thread 11 is similarly displaced downwardly, but not quite as far because of axial compression of the distorted portion of the insert side wall, and in the same manner a third and still lower turn 11''' may also be displaced downwardly at a localized area. Each of the segments 11', and 11", 11''', or the like, which is displaced downwardly, cuts through or deforms the threads 21 of carrier part 20, with the uppermost thread segment 11' desirably being displaced downwardly through a distance corresponding to approximately the lead distance 41 of threads 21, so that some or all of the segments 11', 11" and 11''' are ultimately received circularly opposite or between the undeformed portions of corresponding ones of the threads 21. In this way, the distorted thread segments block or prevent unscrewing rotation of the insert from the position of FIG. 2, relative to carrier part 20.

In order to attain an optimum locking action, it is presently preferred that the outer surface 37 of each of the locking projections 33 be at a diameter corresponding to the major diameter of external threads 11 of the insert. Thus, the projections act to drive portions of the insert wall axially, through the entire thickness of that wall from the location of counterbore 18 to the outer extremities of threads 11, and also in thus displacing the insert wall the projections forceably displace axially the portions of the carrier part threads 21 which are engaged by the axially driven areas of the insert wall. During the driving action, the external surface 30 of supporting portion 29 of the tool body engages counterbore 18 of the insert in a manner preventing radially inwardly displacement or collapse thereof, so that the axial movement of the driven portions of the insert side wall must attain a full locking action, which action can not be adversely affected by inward movement of the insert wall.

Referring now to FIG. 6, we have shown in that figure a variational type of installing tool 23a, which may be considered the same as tool 23 of FIG. 1 except for a change in shape of projections 33a, and the separate formation of an inner part 43 having a portion 29a adapted to be received within counterbore 18a of an associated insert 10a, to support the insert against inward collapse. The main body 44 of tool 23a may contain a cylindrical inner passage 45, within which externally cylindrical element 43 may be slidably received. Element 43 may be spring pressed downwardly by a compression spring 46, which is disposed about a shank portion 47 of element 43, which portion carries an enlargement or washer 48 at its upper end receivable within a recess 49 and engageable against a shoulder 50 to limit downward displacement of element 43 by spring 46. At its lower extremity, element 43 may be externally threaded at 58, with a thread adapted to be screwed into and mate with internal thread 51 of the insert. Element 43 is preferably keyed against rotation relative to body 44, as by sliding reception of a pin 52 affixed to body 44 within an axially elongated slot 53 in body 44.

In using the tool of FIG. 6, a user first screws insert 10a onto threaded portion 58 of element 43, to a position in which end surface 15a of the insert engages projections 33a of the tool. In this condition, the insert may be screwed into carrier part 20a by turning of tool 23a, until projections 33a engage the outer surface of the carrier part. When the insert reaches this position, the body 44 of tool 23a is driven axially inwardly (downwardly in FIG. 6), to cause projections 33a to form notches or locally deformed areas in the insert in the same manner discussed in connection with FIG. 1. A major difference from FIG.

1 is that, during this driving operation, the element 43 of FIG. 6 does not move downwardly, but remains fixed as element 44 moves downwardly thereabout, as permitted by compression of spring 46. After the driving operation, the element 44 is permitted to be returned upwardly by spring 46, following which tool 23a may be turned in an unscrewing direction to withdraw the tool from the insert, which remains locked in the carrier part in the same manner discussed in connection with the first form of the invention.

The projections 33a in FIG. 6 are typically represented as of a downwardly tapering, more rounded, and less abrupt form than in FIGS. 1 to 5. Thus, instead of tending to cut sharply into the insert and carrier part, the projections tend more to locally distort or deform the upper threads into a wave pattern as shown, still with the result of locking the insert against removal.

We claim:

1. A tool for installing an element having external threads within a recess in a carrier part comprising a body adapted to be driven axially relative to said element with the latter in said carrier part and in threaded engagement therewith, at least one localized locking projection carried by said body and projecting axially toward said element and adapted upon said axial driving of the body to locally recess a first portion of an end surface of said element axially inwardly relative to a circularly offset second portion thereof, and to thereby locally drive a portion of an end turn of said external threads axially relative to another portion of the same turn, an internal support part radially inwardly of said projection and projecting axially for reception within an end portion of said element to protect it against collapse upon driving of the body, means mounting said support part for axial sliding movement relative to said body, and means yieldingly urging said support part axially toward said element relative to said body.

2. A tool as recited in claim 1, including external threads on said support part for engaging internal threads in said element axially beyond said end portion thereof.

3. A tool for installing in a carrier part an element having first threads for engaging said carrier part and having second threads for engaging another member, comprising means forming mounting threads on the tool engageable with said second threads to connect the tool to the element so that the tool may screw the element into said carrier part, a tool body adapted to be driven along an axis relative to said element, while said mounting threads are connected to said second threads, means forming a localized deforming shoulder which is located at one side of said axis and is not circularly continuous thereabout, and is movable axially with said body, while the tool threads remain connected to said second threads, said deforming shoulder being positioned to engage and locally deform a portion of said element at said one side of its axis but not circularly thereabout, upon said axial movement, in a relation locking the element against removal from the carrier part with said tool.

4. A tool for installing in a carrier part an element having first threads for engaging said carrier part and having second threads for engaging another member, comprising a first tool section having mounting threads engageable with said second threads to connect the tool to the element so that the tool may screw the element into said carrier part, a second tool section adapted to be driven along an axis relative to said first section and relative to said mounting threads thereof and said element, while said mounting threads are connected to said second threads, and means forming a localized deforming shoulder which is located at a side of said axis and is not circularly continuous thereabout and is movable axially with said second section, while the mounting threads remain connected to said second threads, said deforming shoulder being positioned to engage and locally deform a portion of said element at a side of its axis but not circularly thereabout, upon said axial movement, in a relation locking the element against removal from the carrier part with said tool.

5. A tool for installing an element having external threads within a recess in a carrier part comprising a body adapted to be driven axially relative to said element with the latter in said carrier part and in threaded engagement therewith, at least one localized locking projection carried by said body and projecting axially toward said element and adapted upon said axial driving of the body to locally recess a first portion of an end surface of said element axially inwardly relative to a circularly offset second portion thereof, and to thereby locally drive a portion of an end turn of said external thread axially relative to another portion of the same turn, and an internal support structure radially inwardly of said projection and projecting axially for reception within an end portion of said element to protect it against collapse upon driving of the body, said support structure having an outer surface of essentially circular cross section for engaging and supporting a counterbore surface in said element, said locking projection having an axially facing end surface for engaging and recessing said element and which is disposed substantially transversely of the axis of said threads and which extends radially inwardly to and meets said outer surface of the support structure.

6. A tool as recited in claim 5, in which said outer surface of the support structure continues both axially inwardly and axially outwardly of said axially facing end surface of the locking projection, there being a pilot projection carried by and projecting axially inwardly beyond said support structure and having an outer surface of circular cross section smaller than said outer surface of the support structure for engaging internal threads in said element in centering relation.

7. The method of installing within a carrier part an element having first threads to engage said part and having second threads for engaging another member, comprising threadedly connecting said element to a turning and staking tool having threads which engage said second threads, turning said tool and the connected element and thereby screwing said element into said carrier part, then locally deforming a portion of said element at a predetermined location about its circular extent but not at another circularly offset location while the tool is connected to the element and in a relation locking the element against removal with the tool, and unscrewing said tool from the element.

8. The method of installing within a recess in a carrier part an element having a locking portion with a generally tubular side wall which has an outer end surface, said element having an external first thread to threadedly engage said carrier part and formed at least partially on said locking portion, and having a second thread for engaging another member; said method comprising screwing said external thread of said element into said carrier part to a position in which said tubular locking portion is within the carrier part; applying localized axial force against said end surface of said locking portion at a predetermined location about its circular extent but not at another circularly offset location; locally deforming said side wall of the tubular locking portion axially by said force, across substantially the entire radial thickness of said side wall, at said predetermined location but not at said circularly offset location; and thereby driving axially through a substantial distance a predetermined portion of at least one turn of said external thread relative to an adjacent but circularly offset second portion of the same turn to form a localized axially displaced irregularity in said external thread and thereby lock said element in the carrier part.

9. The method as recited in claim 8, including internally engaging said tubular side wall of the locking portion and supporting it against collapse during said axial deformation of the wall and thread.

10. The method as recited in claim 8, in which said end surface is initially annular, said method including forming a localized recess in said end surface by said localized axial deformation of the side wall and extending through said entire radial thickness of said side wall.

11. The combination comprising a carrier part having an internal thread, and an element mounted in said carrier part and having a locking portion with a generally tubular side wall, said element having an external thread engaging said internal thread and formed at least partially on said tubular side wall of the locking portion, said element having a second thread for engaging another member, said external thread having a turn formed on said tubular side wall which has a first portion driven axially relative to and out of alignment with an adjacent but circularly offset second portion of the same turn and forming a localized axially displaced irregularity in said external thread locking the element in said carrier part, and said tubular side wall having a localized recess extending axially thereinto at the location of said first portion of said turn and recessed inwardly across the entire radial thickness of said tubular side wall.

References Cited by the Examiner

UNITED STATES PATENTS

| | | | |
|---|---|---|---|
| 1,516,762 | 11/1924 | Decker | 151—41.72 |
| 1,896,388 | 2/1933 | Zeidler | 151—42 |
| 2,395,063 | 2/1946 | Pavlus | 151—42 |
| 2,915,930 | 12/1959 | McKean. | |
| 2,984,279 | 5/1961 | Rosan | 151—41.73 |
| 3,003,378 | 10/1961 | Hotchner | 151—22 |
| 3,039,641 | 6/1962 | Rosan | 151—41.72 |
| 3,081,808 | 3/1963 | Rosan et al. | 151—41.73 |
| 3,091,842 | 6/1963 | Creamer | 29—432 |
| 3,160,189 | 12/1964 | Hughes | 151—41.73 |
| 3,180,386 | 4/1965 | Bynum | 151—41.73 |

FOREIGN PATENTS

| | | |
|---|---|---|
| 140,186 | 3/1923 | Great Britain. |
| 471,413 | 9/1937 | Great Britain. |
| 512,008 | 8/1939 | Great Britain. |

CARL W. TOMLIN, *Primary Examiner.*

M. PARSONS, Jr., *Assistant Examiner.*